US007059968B2

(12) United States Patent
Borg

(10) Patent No.: US 7,059,968 B2
(45) Date of Patent: *Jun. 13, 2006

(54) CUING METHOD AND MEANS FOR A GAMING MACHINE TOPPER

(76) Inventor: John D. Borg, 620 S. Woodlawn, Wheaton, IL (US) 60187

( * ) Notice: Subject to any disclaimer, the term of this patent is extended or adjusted under 35 U.S.C. 154(b) by 445 days.

This patent is subject to a terminal disclaimer.

(21) Appl. No.: 10/207,255

(22) Filed: Jul. 25, 2002

(65) Prior Publication Data

US 2004/0018879 A1 Jan. 29, 2004

(51) Int. Cl.
*A63F 13/00* (2006.01)

(52) U.S. Cl. ............................ 463/46; 463/16; 463/20

(58) Field of Classification Search ............ 463/46–47, 463/16–20, 25, 33–34; 273/138.1, 138.2, 273/139, 143 R, 269; 283/903

See application file for complete search history.

(56) References Cited

U.S. PATENT DOCUMENTS 3,918,716 A * 11/1975 Nonaka et al. ............... 463/21
4,208,833 A * 6/1980 Wolf .......................... 446/136
RE32,106 E * 4/1986 Lemelson .................. 446/138
5,320,351 A * 6/1994 Suzuki ......................... 463/6
5,560,603 A * 10/1996 Seelig et al. ................... 463/6
6,318,721 B1 * 11/2001 Randall et al. ......... 273/148 R
6,606,081 B1 * 8/2003 Jaeger et al. ............... 345/111
6,656,041 B1 * 12/2003 Kaminkow et al. ........... 463/16
6,702,409 B1 * 3/2004 Hedrick et al. .......... 312/223.1
2002/0065126 A1 * 5/2002 Miller et al. .................. 463/20
2002/0094856 A1 * 7/2002 Bennett et al. ............... 463/16
2002/0151354 A1 * 10/2002 Boesen et al. ................ 463/25
2003/0017865 A1 * 1/2003 Beaulieu et al. .............. 463/16
2004/0002373 A1 * 1/2004 Kaminkow .................. 463/20

* cited by examiner

*Primary Examiner*—Jessica Harrison
*Assistant Examiner*—Jason Skaarup
(74) *Attorney, Agent, or Firm*—Wood, Phillips, Katz, Clark & Mortimer

(57) ABSTRACT

A topper construction for a gaming device or pinball machine, or similar article, has an illuminated pointer/director that utilizes a master-slave, driver-follower arrangement of magnetically linked elements to move over a display field in a pre-programmed manner to cue the player as to attainable goals and places. The master-driver is driven by a dual rack system controlling movement on X-Y axes, or by a cranking mechanism driven in an orbital or circular pattern. The pointer/director is hidden from the player's sight until the bonus round/feature begins.

19 Claims, 7 Drawing Sheets

CUING METHOD AND MEANS FOR A GAMING MACHINE TOPPER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Gaming machines such as coin and slot machines, and pinball machines and similar entertainment devices, are customarily provided with toppers, i.e., for example, a screen which may be disposed vertically to extend upwardly, or which may be disposed generally horizontally, but in either instance, located in front of the machine player and on which appears art work depicting a scene establishing a theme for the machine, and containing values, or places, achievable by the player in the course of operating the machine. Such toppers are frequently equipped with a power assisted mechanical pointer/director which is motor driven through a mechanical transmission. The pointer/director is carried on rails, or rods, or tracks, necessitating the provision of routings or openings on the arted panel of the topper. The pointer/director may be guided to a designated position on the arted panel which informs and cues the player as to the value, or place, or feature, such as a bonus round, that the player will be awarded upon continuing play on the gaming machine or amusement device.

In one such prior art machine in current usage, a topper includes a three-dimensional figure which is movably mounted on a pole that extends upwardly into and through the arted panel on the topper towards a goal at the top of the topper. The figure has, or is given, an allotted amount of playing time, or an allotted number of handle pulls, to reach the goal. The figure "climbs" against the back drop of an arted topper in a display field containing values disposed at spaced apart sites offering awards to the successful player who continues to operate the machine. Because of the necessity of employing structural interruptions in the arted panel, the topper is subject to severe restrictions as to potential utility.

BRIEF SUMMARY OF THE PRESENT INVENTION

The present invention utilizes an illuminated animation, or pointer/director, that requires no openings, routings, tracks, rails or other interruptions of an arted panel incorporated in a topper. Further, the animation, or pointer/director, can be hidden from the sight of the machine player until the player has earned entitlement to a bonus round or is eligible to the potential benefits of a feature, or place, depicted on the arted panel. More specifically, the present invention contemplates the utilization of a magnetic driver magnet concealed behind the topper art work at all times, and a follower magnet magnetically linked thereto and movable in unison with the driver magnet over the plane of the topper art work. The follower magnet may be completely hidden from the player's sight until the bonus round and/or until the feature begins, whereupon the driver magnet enters the display field for animated actuation to cue the player as to potential awards.

Further, the topper may be operated in an attract mode, while the gaming machine is not in active play, so that the animation will attract potential players.

DETAILED DESCRIPTION OF THE INVENTION

In using the term "gaming machine," reference is intended to any and all machines, games and entertainment devices in which a topper is used and on which an arted panel is utilized to attract players in an attract mode, and to cue players during play, whether or not such machines can be played for no charge, or whether the machines are accessed with the use of coins, tokens, or legal tender, and, in any event, wherein the topper is used to cue the player as to goals the player may achieve, or awards the player may receive upon operating the machine.

Figure 1:
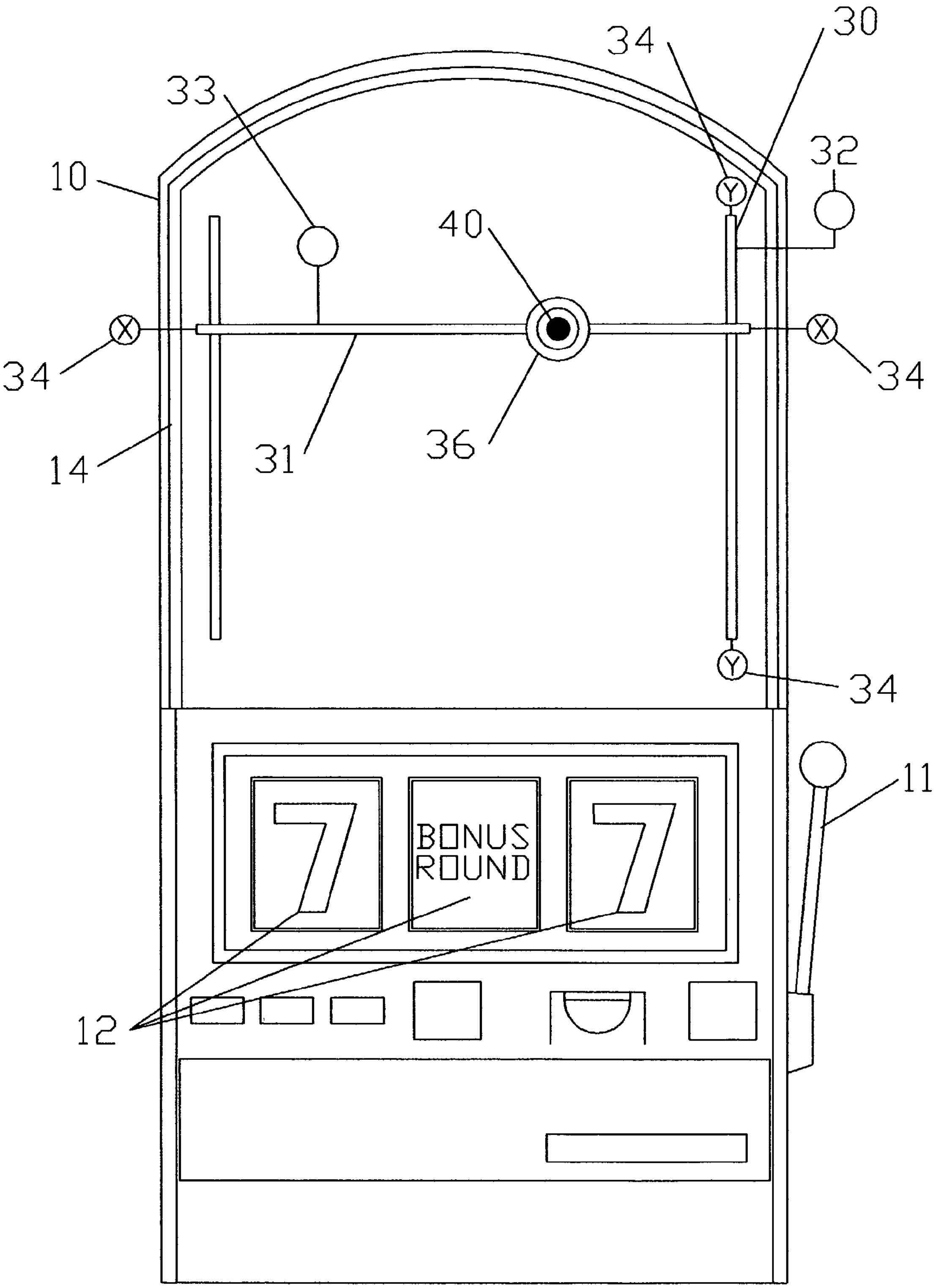
FIG. 1 is a front elevation view of a gaming machine incorporating the topper construction and capable of practicing the method of the present invention, but with the arted glass sheet removed to reveal additional details of the topper construction.
Figure 2:
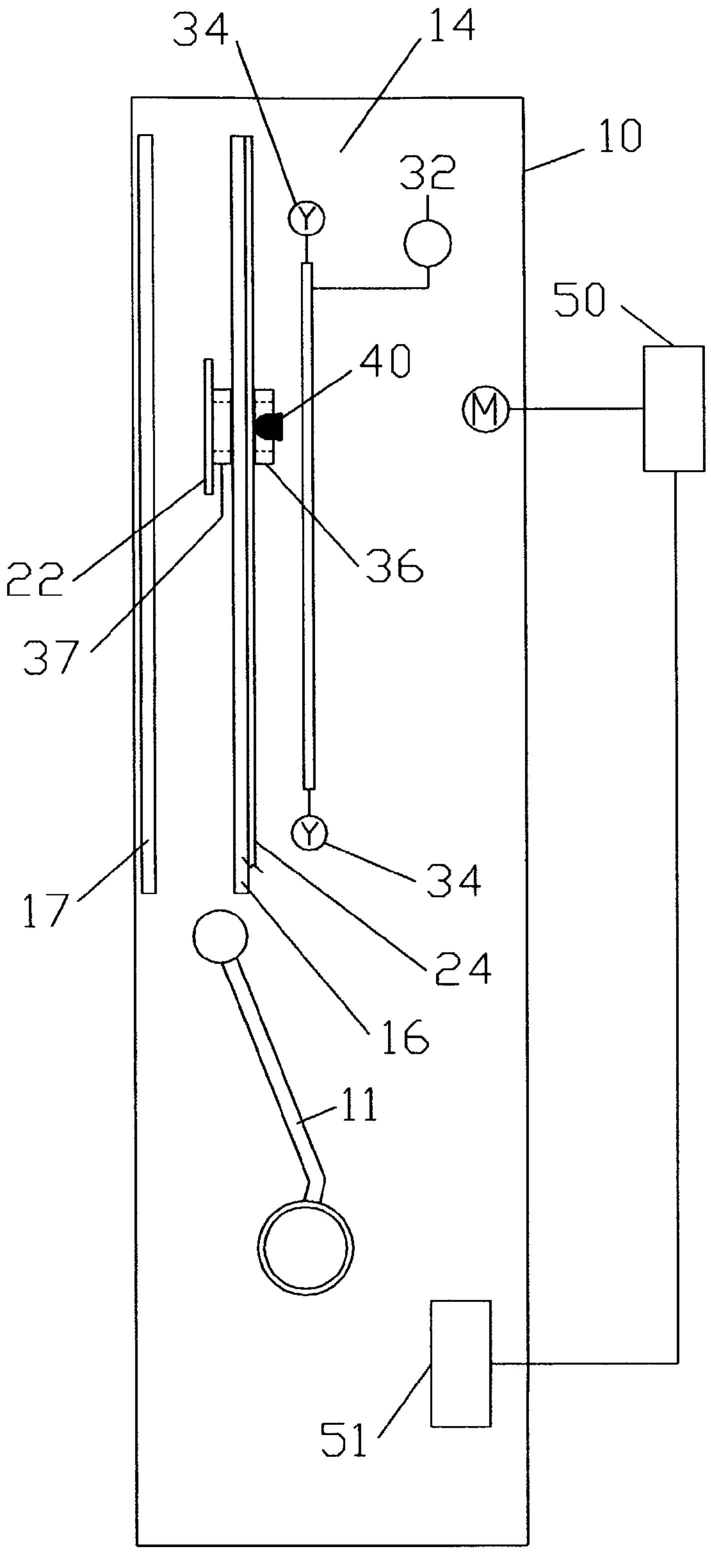
FIG. 2 is a side elevation view of the machine of FIG. 1, but with the arted glass in assembled position as part of the topper construction.

Referring to the drawings, in FIGS. 1 and 2, a typical gaming machine described only for purposes of exemplification, is shown at 10 having an actuating handle 11 by means of which a mechanism in the machine 10 will operate moving elements of the apparatus which includes means for driving and spinning mechanical or video symbols disposed in columns shown at 12. The object of the game is to align similar symbols in three separate columns in a single row. It should be understood that the present invention is equally applicable to machines of the type that can be operated with power assisting means so that the player need only push a button in control of appropriate electrical circuit means, rather than pull the handle 11.

Figure 3:
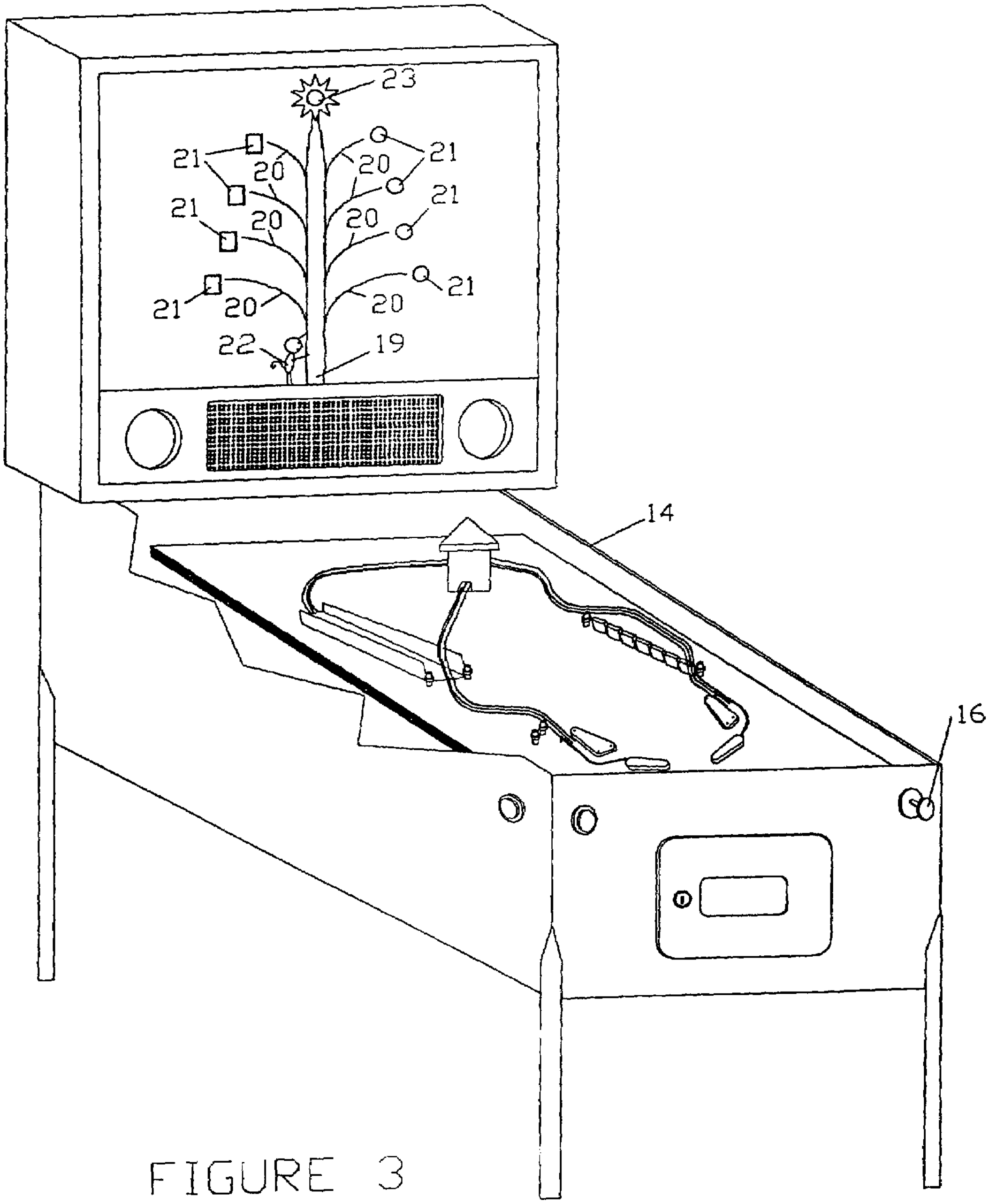
FIG. 3 is a perspective view of a different form of machine, or amusement device, to wit, a pinball machine incorporating the topper construction of the present invention.

In FIG. 3 a pinball machine is shown at 14 played on a sloping board and having an actuator 16 which may be manipulated to propel, or shoot, a ball, usually driven by a spring, up a side passage and cause it to roll back down against pins, or bumpers, and through channels which electrically record the score, or to shoot a pin ball into pockets at the back of the board having appropriate sensor means connected to the electrical control system of the machine.

In both forms of games, or machines, depicted in the drawings of FIGS. 1–3, there is provided in accordance with this invention a topper construction that requires no openings or routings on an arted panel in the topper's arted panel.

Figure 4:
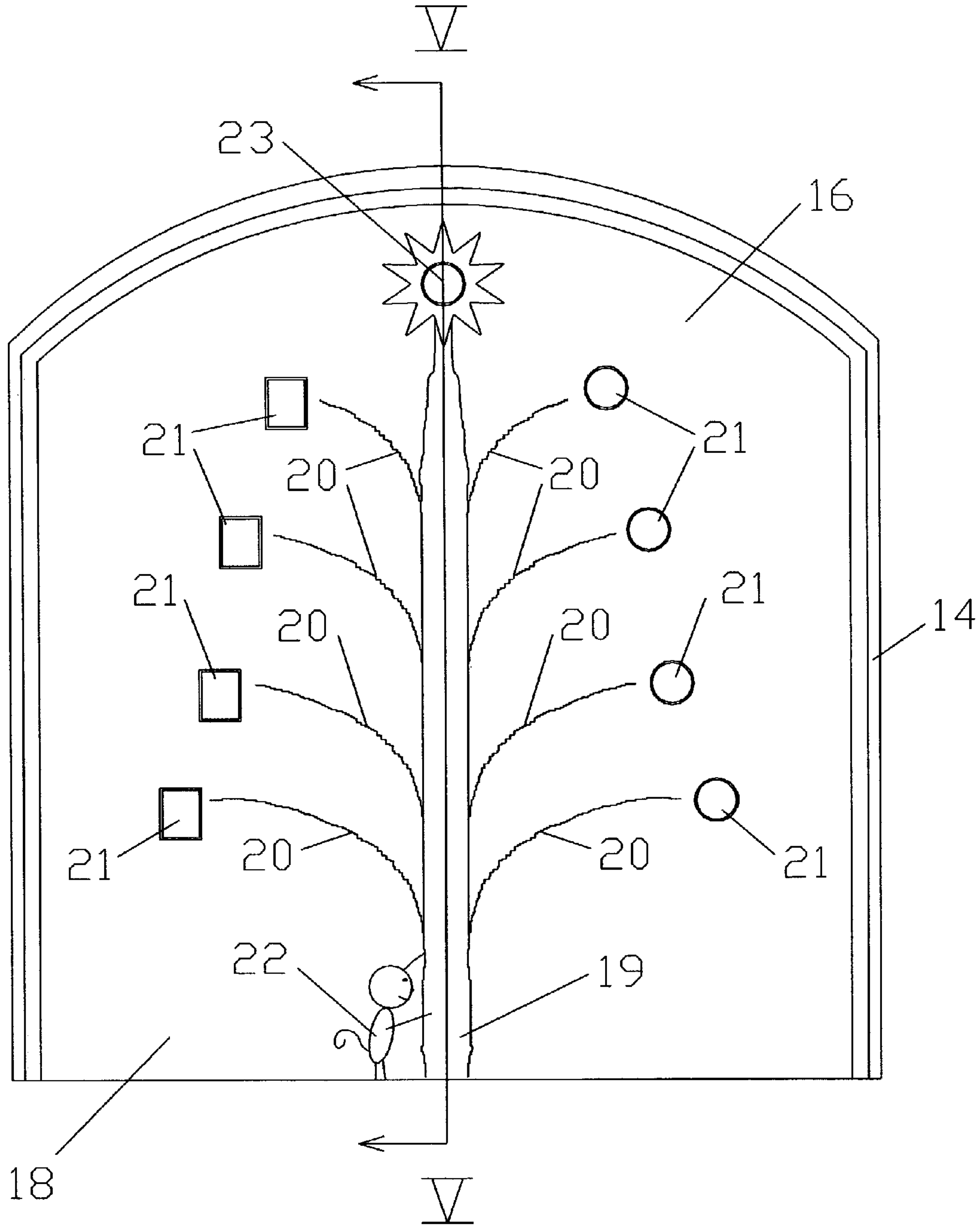
FIG. 4 is a somewhat fragmentary front elevation view of a topper's arted glass which is utilized in machines incorporating the principles of the present invention.
Figure 5:
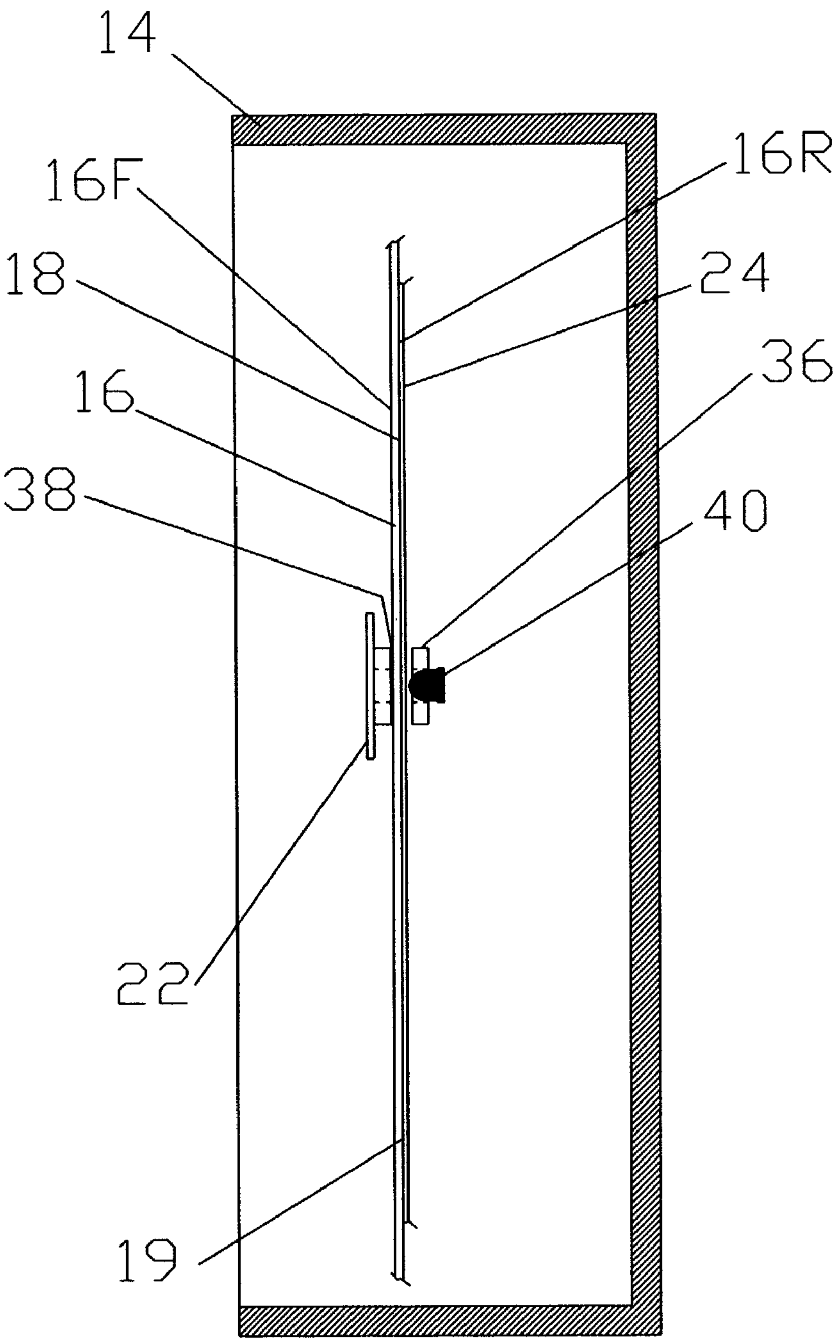
FIG. 5 is a cross-sectional view of the topper's arted glass taken on the plane of line V—V of FIG. 4.

Referring first of all to FIGS. 4 and 5, a sheet-form glass or transparent plastic sheet 16 is mounted in a frame 14 providing an enclosure with a clear front glass 17 so that the glass or plastic sheet 16 can be erected in a generally vertical disposition in the sight line of the machine player and connected in firm assembly with the machine with which the topper is associated. It should be understood that the glass or plastic sheet 16 could also be disposed in a generally horizontal plane. However, the features of this invention are independent of whether the sheet 16 is vertical or horizontal and the details of the vertically disposed sheet 16 should be sufficient for a thorough understanding of the inventive subject matter as applied to both.

The glass or plastic sheet 16 has a rear side 16 R on which is affixed a physical layer, or coating, of pictorial art depicting any desired selected characteristics, thereby to provide an arted panel 18.

By way of exemplification, but not by way of limitation, I have illustrated in FIGS. 3 and 4 an arted panel depicting a tree having a main trunk 19 and a plurality of separate branches 20, each bearing a piece of fruit situated at a pre-selected site 21 and wherein the sites 21 are pre-programmed as part of the electrical control system of the machine to represent different values, or places, which can be attained by an animated figure of a climbing animal, such as a monkey 22. At the very top of the tree trunk 19 is a star 23, which for purposes of this disclosure, will represent a special value such as a bonus round of play, or an attainable ultimate goal of the player.

In order to protect the arted panel 18, a thin protective sheet 24 is provided which may be made of a plastic material such as a clear acrylic, or a PETG (Polyethylene Toluene Glycol) plastic. The glass or plastic sheet 16 is clear and transparent so that the arted panel 18 may be clearly visible to the player through the front side 16 F of the glass or plastic sheet 16 while positioned in operating relationship to the machine. Moreover, the arted panel 18 is sufficiently opaque that any operating mechanism forming a part of the topper construction may be effectively shielded and concealed and will be hidden from the player's sight.

In the form of the invention disclosed in FIGS. 1–5, a driving mechanism takes the form of dual rack system has a motor driven vertical rack 30 and a motor driven horizontal rack 31, each powered by a suitable electric gear motor and/or subfractional electric stepping motor 32, and 33, respectively. The dual rack system provides a basis for movement on an X-Y axis relative to the glass or plastic sheet 16 behind which it is positioned. It will be understood that opto switches identified schematically at 34 are used as end and limit switches. The racks 30 and 31 are disposed respectively on X and Y axes.

Figure 6:
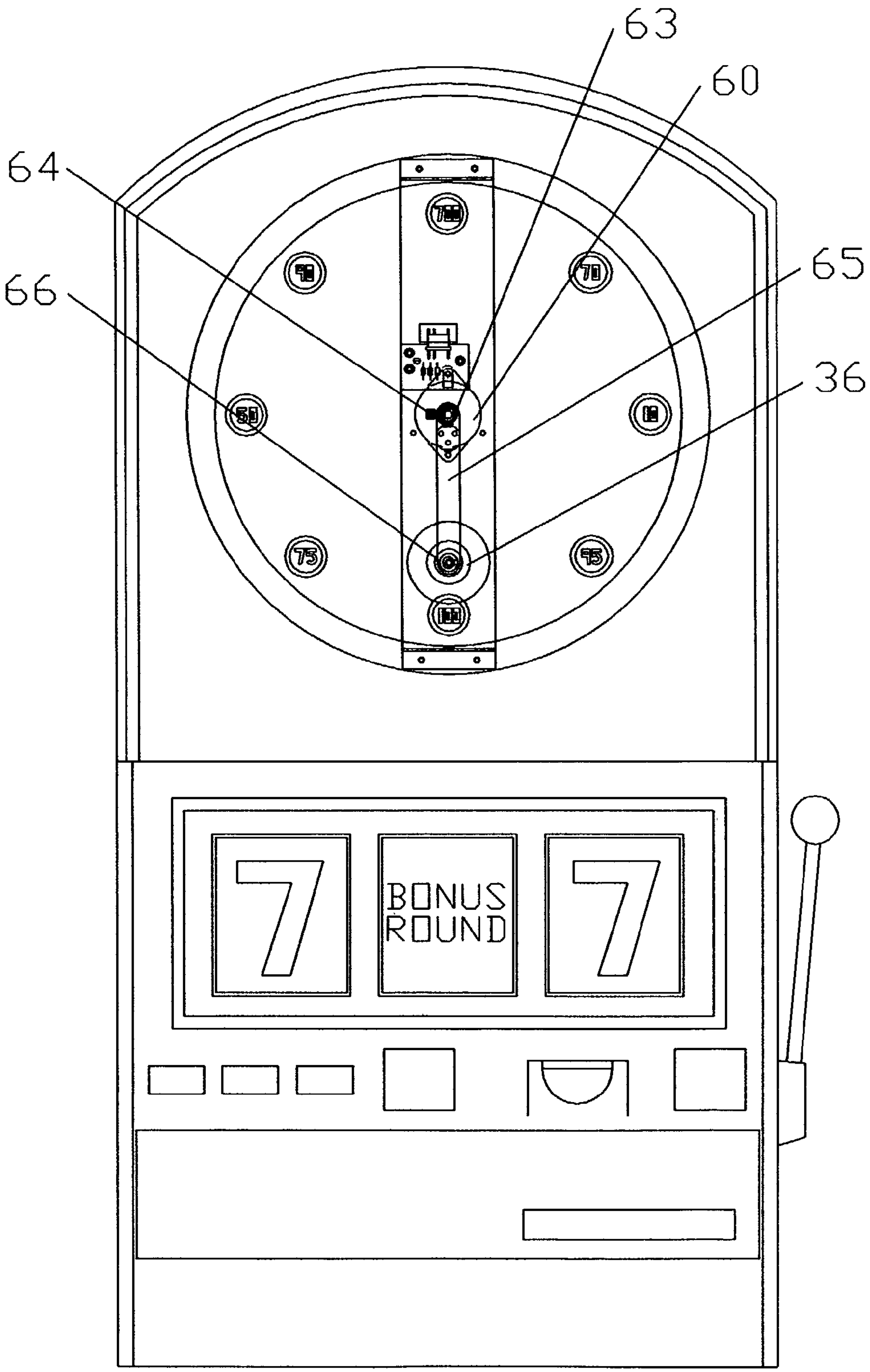
FIG. 6 is a fragmentary front view of the driving mechanism of another form of the present invention.
Figure 7:
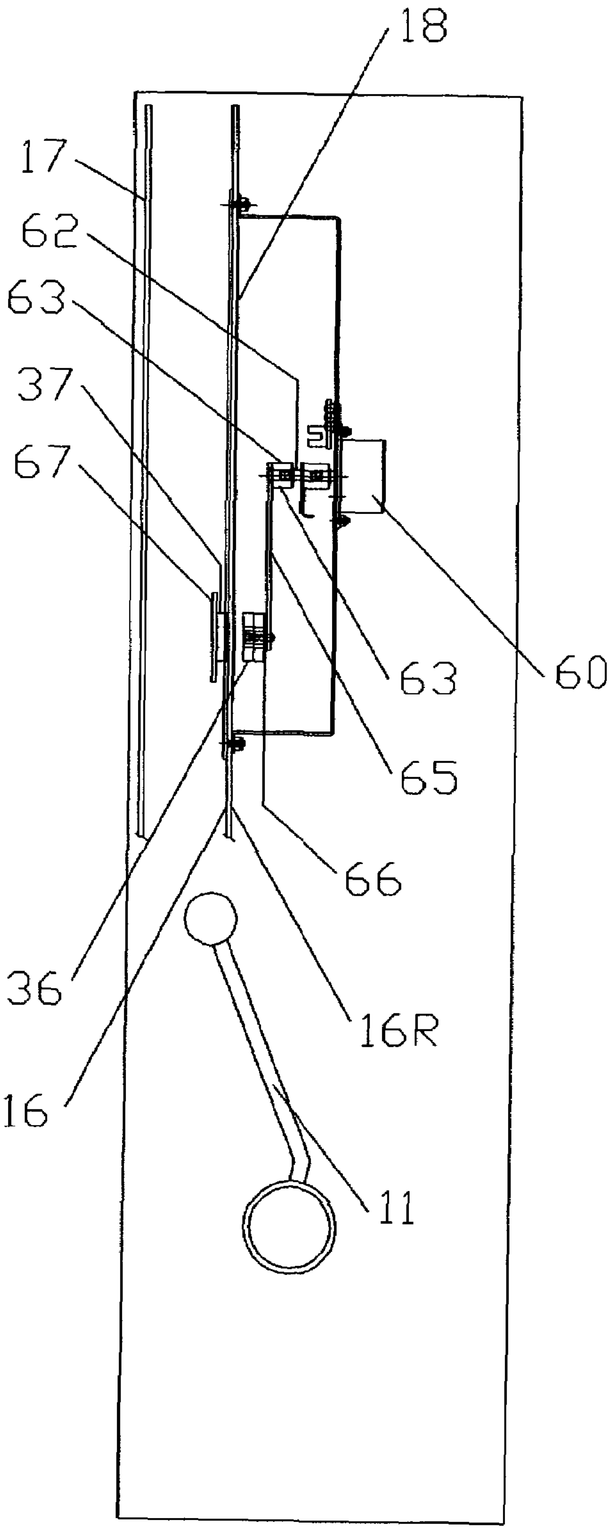
FIG. 7 is a fragmentary side view of the driving mechanism of FIG. 6.

In the form of the invention disclosed in FIGS. 6 and 7, a driving mechanism takes the form of a cranking mechanism whereby rotary motion of a drive shaft can be converted into rectilinear motion or circular motion, for example, by the use of an arm or a linkage secured at right angles to the end of a shaft, thereby to describe an enlarged circular or orbital path within the bounds of a display field.

In order to provide a driver for the arrangement of FIGS. 1–5, a first magnet comprising a ceramic ring-type drive magnet 36 is supported on the motorized dual rack system behind the arted glass or plastic sheet 16. It should be understood that the drive magnet 36 could also be an electromagnetic powered by the usual electrical source of supply for the machine, since the drive magnetic and any trailing electrical conduits or wires, would be concealed from the player. The drive magnet 36 functions as a master magnet and is disposed to travel on the flat surface of the protective sheet 24 so that the topper's arted panel 18 is protected from being scratched from behind.

A second magnet, consisting of an arted follower magnet 37, is disposed on the front side, or front face, 16 F of the glass sheet 16. As referred to above, in the exemplary form of the present disclosure, the follower magnet is artistically formed, covered by, or incorporated in, an arted element 22. For example, in the present disclosure it would be appropriate for the arted element 22 to assume the shape of a climbing animal such as a monkey.

It is also contemplated that the follower magnet 37 has an adhesive felt or plastic surface backing 38 to promote and facilitate a good sliding contact with the front face 16 F of the glass sheet 16. The follower magnet 37 is magnetically linked as a slave magnet with the master magnet 36 and moves in unison therewith. Accordingly, the follower magnet 37 functions as the "Pointer" or "Director" on the front face 16 F of the arted panel 18 of the gaming machine of FIGS. 1–2 where it can be used in so-called bonus rounds.

In the event a protective sheet 24 is not feasible, the drive magnet 36 could be operated in spaced non-engagement with the arted panel 18, provided, of course, that the drive magnet 36 and the follower magnet 37 are spaced in such a relationship as to be magnetically linked together so that they move in unison.

To further enhance the versatility of the present invention, the driver magnet 36 is provided with a bright led lamp 40 fixed to the magnet 36 and aligned at its center. Thus, the arted follower magnet 37 makes its move to the designated value or feature/place on the arted panel 18. The led lamp 40 will illuminate a corresponding one of the various sites 21 identifying a pre-determined value or feature/place. In other words, the led lamp 40 and the follower magnet 37 cues the player that the illuminated site 21 is the value or feature/place that the player would be awarded.

Referring further to FIGS. 6 and 7, a gear motor 60 rotatably drives an output shaft 62 to which is staked a collet 63 by means of a set screw 64. In this form of the invention, the driver magnet 36 is connected to the end of a lever arm 65 by means of a coupling connector 66. Note that the driver magnet 36 is spaced from the rear surface 16 R and the arted display field 18, so there is no deteriorative engagement there between. However, the driver magnet 36 is magnetically linked to the follower magnet 37, and, as has been previously described, the follower magnet may be provided with a suitable art cover 67. Values, or places, such as the sites 21, could be located on the display field 18 and in the orbital path of the follower magnet 37, for example, in the patterned manner of a roulette wheel.

With each of the foregoing arrangements, since there are no tracks or openings in the arted panel 18, the arted pointer/director can be hidden from the players sight until a bonus round begins, whereupon the follower magnet 37 allows the arted element 22 to appear and move in an animated fashion within the metes and bounds of the arted panel 18.

It will be understood that the subject matter of the present invention can be effectively utilized with any machine of original equipment manufacture (O. E. M.) and/or could be retrofitted with after-market machines. In each instance, the gaming machines are of the type having a programmable electrical operating mechanism shown schematically at 50 so that the operation of the driving mechanisms, either the dual rack system or the cranking mechanism, will be coordinated and synchronized with the operation of the gaming device, which is operated by a gaming machine mechanism 51.

Although various modifications might be suggested by those versed in the art, I wish to embody within the scope of the patent warranted hereon all such modifications as reasonably and properly fall within the scope of my contribution to the art.

The invention claimed is:

1. A topper mechanism for combination with a gaming device comprising a dual X-Y rack system having an actuator powered by electric motors to provide movement of said actuator on X-Y axes, a ceramic driving magnet supported on said actuator, a vertical transparent sheet in front of said rack system to provide an arted screed formed on its back surface and providing an artistic display field in which selected different cue values are disposed in spaced apart relation in the display field, a secondary follower magnet on the front side of said transparent sheet, said follower magnet being arted to form a pointer/director movable on the front face of the arted display field, said driving and follower magnets being magnetically linked in a master/slave relation to move in unison relative to said display field, and programmable control means regulating said dual rack system in synchronism with the gaming device so that the player may be automatically cued as to values, or features and places the player will be awarded while operating the gaming device, said arted screen and said X-Y rack system being disposed with said pointer/director out of the player's sight during normal game play, and said programmable control means being pre-set to move said pointer/director into said artistic display field to designate a value to start a topper bonus round of play.

2. The invention of claim 1 wherein said transparent sheet comprises a sheet-form glass plate.

3. The invention of claim 1 wherein said electric motors constitute subfractional stepping motors.

4. The invention of claim 2 wherein a thin sheet of protective plastic material is formed on the back face of said glass plate forming a protective surface on said arted screen on which said driving magnet moves and protecting said artistic display field from damage by said driving magnet.

5. The invention of claim 4 wherein said arted screen opacifies said back surface of said glass plate to conceal the rack system from the player.

6. The invention of claim 4 wherein the plastic material constitutes clear acrylic.

7. The invention of claim 4 wherein the plastic material constitutes PETG plastic.

8. The invention of claim 1 wherein said gaming machine comprises a pin ball machine and said programmable control means controls the display of bonus rounds.

9. A topper mechanism for combination with a gaming device comprising a dual X-Y rack system having an actuator powered by electric motors to provide movement of said actuator on X-Y axes, a ceramic ring-type driving magnet supported on said actuator, a vertical transparent sheet in front of said rack system to provide an arted screen formed on its back surface and providing an artistic display field in which selected different cue values are disposed in spaced apart relation in the display field, a secondary follower magnet on the front side of said transparent sheet, said follower magnet being arted to form a pointer/director movable on the front face of the arted display field, said driving and follower magnets being magnetically linked in a master/slave relation to move in unison relative to said display field, and programmable control means regulating said dual rack system in synchronism with the gaming device so that the player may be automatically cued as to values, or features and places the player will be awarded while operating the gaming device; and opto switch means operating as end and limit switches for said dual track mechanism.

10. The invention of claim 9 wherein said arted screen and said X-Y rack system are disposed with said pointer/director out of the player's sight during normal game play, said programmable control means being pre-set to move said pointer/director into said artistic display field to designate a value to start a topper bonus round of play.

11. The invention of claim 10 and further characterized by a bright lamp fixed to the center of said driver magnet, thereby to illuminate the designated value and/or feature on the arted screen to cue the player to the awards.

12. The invention of claim 9 wherein said transparent sheet comprises a sheet-form glass plate.

13. The invention of claim 9 wherein said electric motors constitute subfractional stepping motors.

14. The invention of claim 12 wherein a thin sheet of protective plastic material is formed on the back face of said glass plate forming a protective surface on said arted screen on which said driving magnet moves and protecting said artistic display field from damage by said driving magnet.

15. The invention of claim 14 wherein said arted screen opacifies said back surface of said glass plate to conceal the rack system from the player.

16. The invention of claim 14 wherein the plastic material constitutes clear acrylic.

17. The invention of claim 14 wherein the plastic material constitutes PETG plastic.

18. The invention of claim 9 wherein said gaming machine comprises a pin ball machine and said programmable control means controls the display of bonus rounds.

19. The invention of claim 1 and further characterized by a bright lamp fixed to the center of said driver magnet, thereby to illuminate the designated value and/or feature on the arted screen to cue the player to the awards.

* * * * *